Patented Dec. 14, 1948

2,456,413

UNITED STATES PATENT OFFICE 2,456,413

POLYVINYL ACETAL RESIN COMPOSITIONS

Richard H. Hunt, Springfield, Mass., assignor to Monsanto Chemical Company, St. Louis, Mo., a corporation of Delaware No Drawing. Application September 6, 1945, Serial No. 614,311

12 Claims. (Cl. 260—33.6)

This invention relates to plasticizers for polyvinyl acetal resins. More particularly the invention relates to polyvinyl acetal resins plasticized with terphenyls.

An object of this invention is to provide a new class of plasticizers for polyvinyl acetal resins.

A further object is to provide polyvinyl acetal resins plasticized with terphenyls.

These and other objects are attained by the incorporation of terphenyls into polyvinyl acetal resin.

The following examples are given by way of illustration and are not intended to limit the scope of this invention. Where parts are mentioned, they are parts by weight.

Example I

|  | Parts |
|---|---|
| Polyvinyl butyral resin | 100 |
| Meta diphenyl benzene | 20 |

The plasticizer was milled into the resin on hot malaxating rolls until a homogeneous composition was obtained. The hot mass was then calendered into thin sheets which were more flexible and more water-resistant than similar sheets of unplasticized resin.

Example II

|  | Parts |
|---|---|
| Polyvinyl butyral resin | 100 |
| Ortho diphenyl benzene | 30 |

The resin and plasticizer were compounded as in Example I to obtain a flexible sheet of plasticized polyvinyl butyral resin.

Example III

|  | Parts |
|---|---|
| Polyvinyl butyral resin | 100 |
| Ortho diphenyl benzene | 20 |
| Dibutyl sebacate | 37½ |

The resin and plasticizers were mixed in a standard Banbury type mixer to produce a homogeneous mass. The mass was then extruded into a soft, pliable web.

Example IV

|  | Parts |
|---|---|
| Polyvinyl formal resin | 100 |
| Meta diphenyl benzene | 30 |

The resin and plasticizer were mixed in a standard Banbury mixer to produce a homogeneous mass. The mass was baked in a chase under heat and pressure and the resultant cake skived to produce sheets of plasticized polyvinyl formal resin.

Example V

|  | Parts |
|---|---|
| Polyvinyl butyral resin | 100 |
| Meta diphenyl benzene | 5 |

The resin and plasticizer were compounded as in Example I. The resultant sheets were more flexible than unplasticized resin, but stiffer than the sheets made according to Example I. The moisture resistance of the sheets was substantially improved compared to that of the unplasticized resin.

The resin and plasticizer may be mixed hot on malaxating rolls, or in a Banbury mixer as shown in the examples or by any other conventional means for obtaining a homogeneous mass. They may also be mixed with the addition of a volatile solvent such as alcohol, acetone, ethyl acetate, etc., which is subsequently removed prior to or after the formation of the desired article.

In addition to the ortho and meta diphenyl benzenes, the third isomer, paradiphenyl benzene, or a mixture of two or all of the isomers may be used. This is of particular advantage since a mixture of the isomers is obtained in the commercial production of diphenyl benzene.

The polyvinyl acetal resins employed according to this invention may be made by reacting an aldehylde with a partially or completely hydrolyzed polyvinyl ester. U. S. patent to Morrison et al., Reissue 20,430, dated June 29, 1937, illustrates suitable methods for preparing such resins. Polyvinyl acetal resins prepared in this manner may have a certain number of ester groups, originally present in the polyvinyl ester, which have not been removed, as well as a certain number of hydroxyl groups (which have replaced ester groups) and have not been replaced with acetal groups.

Polyvinyl acetal resins may be made from various aldehydes or mixtures thereof, or even from ketones containing an active carbonyl group, or from mixtures of aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be employed. Polyvinyl acetal resins made from saturated lower aliphatic aldehydes are more commonly used. In particular, polyvinyl acetal resins made with saturated aliphatic aldehydes containing less than 6 carbon atoms and especially those made with formaldehyde, acetaldehyde and butyraldehyde and mixtures thereof, are readily available.

According to one embodiment of the present invention, the polyvinly acetal resins employed may be considered to be made up, on a weight basis, of 5-25% hydroxyl groups, calculated as polyvinyl alcohol, 0-40% acetate groups, calculated as polyvinyl acetate, and the balance substantially acetal.

When the acetal is butyraldehyde acetal, according to one embodiment of this invention, the polyvinyl acetal resin contains, on a weight basis, 16-20% hydroxyl groups, calculated as polyvinyl alcohol, and 0-30% acetate groups, calculated as polyvinyl acetate, and the balance substantially butyraldehyde acetal.

When the acetal is formaldehyde acetal, according to another embodiment of this invention, the polyvinyl acetal resin may contain 5-8% hydroxyl groups, calculated as polyvinyl alcohol, 10-16% acetate groups, calculated as polyvinyl acetate, and the balance substantially formaldehyde acetal.

An example of a polyvinyl acetaldehyde acetal resin is one containing 7% hydroxyl groups calculated as polyvinyl alcohol, 17% acetate groups, calculated as polyvinyl acetate, and the balance substantially acetaldehyde acetal.

Typical of a mixed acetal resin is one which contains 13% hydroxyl groups calculated as polyvinyl alcohol, 2-6% acetate groups, calculated as polyvinyl acetate, and the balance acetaldehyde and butyraldehyde acetal groups, in a molar ratio of 65-50% acetaldehyde and 35-50% butyraldehyde acetal groups.

The plasticizers of this invention may be used alone or in conjunction with other known plasticizers for polyvinyl acetal resins such as alkyl, aralkyl or aryl esters of organic acids, trialkyl, or triaryl phosphates, ether esters, such as alkoxy alkyl phthalates, etc.

Other conventional modifying agents may be added to the compositions of this invention, such as dyes, pigments, fillers, lubricants, natural or synthetic resins, cellulose derivatives, etc.

The polyvinyl acetal resins plasticized with terphenyls may be used to produce sheets, continuous webs, rods or tubes having varying degrees of hardness depending on the amount of plasticizer present. It has been found that as little as 1 part of the plasticizer per 100 parts of resin will substantially soften the polyvinyl acetal resins, while as much as 50 parts of the plasticizer may be incorporated in 100 parts of resin without sweating out of the plasticizer during storage.

The compositions of this invention may be used in innumerable applications, from watch crystals, playing cards and sound-recording discs which require relatively hard, moisture-impervious materials, to safety glass plastics which require soft materials which retain their strength and toughness at the extremes of atmospheric temperatures.

The foregoing description is intended to be illustrative and not limitative of this invention as set forth in the appended claims.

What is claimed is:

1. A polyvinyl acetal resin plasticized with from 1 to 50 parts of a terphenyl per 100 parts of resin.

2. A polyvinyl butyral resin plasticized with from 1 to 50 parts of a terphenyl per 100 parts of resin.

3. A polyvinyl formal resin plasticized with from 1 to 50 parts of a terphenyl per 100 parts of resin.

4. A polyvinyl acetal resin plasticized with from 1 to 50 parts of a mixture of isomeric terphenyls per 100 parts of resin.

5. A polyvinyl butyral resin plasticized with from 1 to 50 parts of a mixture of isomeric terphenyls per 100 parts of resin.

6. A polyvinyl formal resin plasticized with from 1 to 50 parts of a mixture of isomeric terphenyls per 100 parts of resin.

7. A polyvinyl acetal resin plasticized with from 1 to 50 parts of ortho diphenyl benzene per 100 parts of resin.

8. A polyvinyl butyral resin plasticized with from 1 to 50 parts of ortho diphenyl benzene per 100 parts of resin.

9. A polyvinyl formal resin plasticized with from 1 to 50 parts of ortho diphenyl benzene per 100 parts of resin.

10. A polyvinyl acetal resin plasticized with from 1 to 50 parts of meta diphenyl benzene per 100 parts of resin.

11. A polyvinyl butyral resin plasticized with from 1 to 50 parts of meta diphenyl benzene per 100 parts of resin.

12. A polyvinyl formal resin plasticized with from 1 to 50 parts of meta diphenyl benzene per 100 parts of resin.

RICHARD H. HUNT.

REFERENCES CITED

The following references are of record in the file of this patent:

UNITED STATES PATENTS

| Number | Name | Date |
|---|---|---|
| 2,383,145 | Moose | Aug. 21, 1945 |